United States Patent
Xiao et al.

(10) Patent No.: US 8,198,349 B2
(45) Date of Patent: Jun. 12, 2012

(54) SELF-HEALING AND SCRATCH RESISTANT SHAPE MEMORY POLYMER SYSTEM

(75) Inventors: Xingcheng Xiao, Troy, MI (US); Tao Xie, Troy, MI (US); Yang T. Cheng, Troy, MI (US)

(73) Assignee: GL Global Technology Operations LLC, Detroit, MI (US)

( * ) Notice: Subject to any disclaimer, the term of this patent is extended or adjusted under 35 U.S.C. 154(b) by 743 days.

(21) Appl. No.: 12/273,083

(22) Filed: Nov. 18, 2008

(65) Prior Publication Data

US 2010/0125113 A1    May 20, 2010

(51) Int. Cl.
*B22F 1/00* (2006.01)
*C08L 63/00* (2006.01)

(52) U.S. Cl. .......................................... 524/1; 523/468
(58) Field of Classification Search .................. 523/468; 524/1

See application file for complete search history.

(56) References Cited

U.S. PATENT DOCUMENTS

| | | | |
|---|---|---|---|
| 5,755,913 A * | 5/1998 | Liaw et al. ................... | 156/272.6 |
| 6,632,879 B2 * | 10/2003 | Brann et al. ...................... | 525/64 |
| 6,759,481 B2 | 7/2004 | Tong | |
| 6,773,535 B1 * | 8/2004 | Wetzel ............................ | 156/247 |
| 6,827,325 B2 * | 12/2004 | Hofmann et al. .............. | 249/134 |
| 6,986,855 B1 | 1/2006 | Hood et al. | |
| 7,188,498 B2 * | 3/2007 | Browne et al. ..................... | 72/62 |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 * | 2/2006 | Wilson et al. ................... | 525/452 |
| 2006/0156535 A1 | 7/2006 | Browne et al. | |
| 2006/0216222 A1 | 9/2006 | Jang | |
| 2007/0073130 A1 | 3/2007 | Finch et al. | |
| 2007/0289786 A1 | 12/2007 | Cutkosky et al. | |
| 2008/0300331 A1 * | 12/2008 | Schellenberg et al. .......... | 521/82 |
| 2010/0096597 A1 * | 4/2010 | Prud'Homme et al. ....... | 252/511 |
| 2010/0164330 A1 * | 7/2010 | Komatsu et al. ............... | 310/365 |
| 2010/0206811 A1 * | 8/2010 | Ng et al. ......................... | 210/654 |
| 2011/0007477 A1 * | 1/2011 | Xu et al. ......................... | 361/718 |
| 2011/0201764 A1 * | 8/2011 | Armeniades et al. .......... | 525/523 |

FOREIGN PATENT DOCUMENTS

| | | |
|---|---|---|
| GB | 2464085 A | 7/2010 |
| WO | WO 2007070877 A2 * | 6/2007 |
| WO | 2008/054356 A2 | 5/2008 |
| WO | 2008054356 A2 | 5/2008 |

OTHER PUBLICATIONS

Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.

(Continued)

*Primary Examiner* — Mark Eashoo
*Assistant Examiner* — Megan McCulley
(74) *Attorney, Agent, or Firm* — BrooksGroup

(57) ABSTRACT

An exemplary embodiment discloses a polymer system including a shape memory polymer material and a graphene material.

14 Claims, 3 Drawing Sheets

OTHER PUBLICATIONS

Xie, U.S. Appl. No. 12/178,844, High Strength Reversible Noncovalent Adhesion Methods for a Solid Polymer-Polymer Interface, filed Jul. 24, 2008.
Cheng, U.S. Appl. No. 12/359,709, Remote Activation of Thermo-Reversible Dry Adhesives, filed Jan. 26, 2009.
Xie, U.S. Appl. No. 12/423,947, Shape Memory Polymer and Adhesive Combination and Methods of Making and Using the Same, filed Apr. 15, 2009.
Xie, U.S. Appl. No. 12/432,211, Shape Memor Polymers with Surface Having Dangling Adhesive Polymeric Chains and Methods of Making and Using the Same, filed Apr. 29, 2009.
Xie, U.S. Appl. No. 12/181,562, Polymer Systems with Multiple Shape Memory Effect, filed Jul. 29, 2008.
Xie, U.S. Appl. No. 11/867,549, Method of Miniimizing Residue Adhesion for Thermo-Reversible Dry Adhesives, filed Oct. 4, 2007.
Xie, U.S. Appl. No. 12/105,865, Attachment Pad with Thermal Reversible Adhesive and Methods of Making and Using the Same, filed Apr. 18, 2008.
Xie, U.S. Appl. No. 11/867,558, Multilayer Adhesive for Thermal Reversible Joining of Substrates, filed Oct. 4, 2007.
Xie, U.S. Appl. No. 12/391,704, Reversible Dry Adhesives for Wet adn Dry Conditions, filed Feb. 24, 2009.
Xie, U.S. Appl. No. 12/105,749, Method for Robotic Handling Using Thermo-Reversible Dry Adhesives, filed Apr. 18, 2008.
Xie, U.S. Appl. No. 12/105,788, Climbing Devices Based on Thermo-Reversible Dry Adhesives, filed Apr. 18, 2008.
German Office Action of Application No. DE 10 2009 053 115.7-43; Dated Jan. 21, 2011; 2 pages.
Xie et al., Self Peeling Reversible Dry Adhesive System; Chem. Mater. 2008, 20, pp. 2866-2868.
Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.
EPON Resin 828 Structural Reference Manual, Shell Chemicals, Houston, TX.
Gall et al., Shape Memory Polymer Nanocomposites, Acta Materialia, 2002, pp. 5115-5126, vol. 50.
Gall et al., Internal Stress Storage in Shape Memory Polymer Nanocomposites, Applied Physics Letter, Jul. 12, 2004, pp. 290-292, vol. 85, No. 2.
Xu et al., Synthesis and Shape Memory Effects of Si-O-Si Cross-Linked Hybrid Polyurethanes, Polymer, 2006, pp. 457-465, vol. 47.
Crystallisation of Liquid DGEBPA and DGEBPA Epoxy Resins, Resolution Performance Products, Product Bulletin, SC:2365-01, Jul. 2001.
Jeffamine D-230 Polyetheramine, Technical Bulletin, Huntsman Corporation, Copyright 2006.
Behl et al., Shape-Memory Polymers: Dual Shape Materials for Bio-medical Applications, A. Mater. Today, 2007, vol. 10, pp. 1-20.
Bellin et al., Polymeric Triple-Shape Materials, PNAS, Nov. 28, 2006, vol. 103, No. 48, pp. 18043-18047.
Chung et al., Two-Way Reversible Shape Memory in a Semicrystalline Network, Macromolecules, 2008, vol. 41, pp. 184-192.
Rousseau et al., Shape Memory Effect Exhibited by Smectic-C Liquid Crystalline Elastomers, J. Am. Chem. Soc., 2003, vol. 125, pp. 15300-15301.
Liu et al., Review of Progress in Shape-Memory Polymers, Journal of Materials Chemistry, 2007, vol. 17, pp. 1543-1558.
Dietsch et al., A Review—Features and Benefits of Shape Memory Polymers (SMPs), Journal of Advanced Materials, Apr. 2007, vol. 39, No. 2, pp. 3-12.
Li et al., Shape Memory Effect of Ethylene—Vinyl Acetate Copolymers, Journal of Applied Polymer Science, 1999, vol. 71, pp. 1063-1070.
Liu et al., Novel Shape-Memory Polymer with Two Transition Temperatures, Macromol. Rapid Commun., 2005, vol. 26, pp. 649-652.
Reyntjens et al., Polymer Networks Containign Crystallizable Poly(octadecyl vinyl ether) Segments for Shape-Memory Materials, Macromol. Rapid Commun., 1999, vol. 20, pp. 251-255.
Jiang et al., Polymers Move in Response to Light, Advanced Materials., 2006, vol. 18, pp. 1471-1475.
Xie et al., Self-Peeling Reversible Dry Adhesive System, Materials, & Processes Laboratory, General Motors Research & Development Center, Chem. Mater. 2008, vol. 20, pp. 2866-2.
Aubert et al., Thermally Removable Epoxy Adhesives Incorporating Thermally Reversible Diels-Alder Adducts, The Journal of Adhesion, 2003, vol. 79, pp. 609-616.
International Search Report and Written Opinion, International Application No. PCT/US/2008/060796 Filed Apr. 18 2008, Appicant GM Global Technology Operations, Inc.
Unver et al., Geckbot: A Gecko Inspired Climbing Robot Using Elastomer Adhesives.
Daltorio et al., A Small Wall-Walking Robot with Compliant, Adhesive, Feet, IEEE/RSJ International Conference on Intelligent Robots and Systems, 2005, pp. 4018-4023.
International Search Report and Written Opinon, International Application No. PCT/US2008/060826 filed Apr. 18, 2008, Applicant GM Global Technology Operations, Inc.
Lee et al., A Reversible Wet/Dry Adhesive Inspired by Mussels and Geckos, Nature, Jul. 19, 2007, pp. 338-342, vol. 448.
Lee et al., Single-Molecule Mechanics of Mussel Adhesion, PNAS, Aug. 29, 2005, pp. 12999-13-3, vol. 103, No. 35.
Veriflex Shape Memory Polymer, http://www.crgrp.net/veriflex.shtml, Cornerstone Research Group, Inc., 2003-2007.
Shape Memory Polymer, http://crgnp.net/success-stories.shtml, Cornerstone Research Group, Inc., 2003-2007.
TEMBO Shape Memory Polymers and Elastic Memory Composite (EMC) Material, http://www.ctd-materials.com/products/emc.htm, Cornerstone Research Group, Inc., 2003-2007.
Huang et al., Water-Driven Programmable Polyurethane Shape Memory Polymer: Demonstration and Mechanism, Applied Physical Letters, 2005, Vol, 86, pp. 114105-1-3.
Lendlein et al., Light-Induced Shape-Memory Polymers, Nature, Apr. 14, 2005, vol. 434, pp. 879-882.
Goethals et al., Poly(vinyl ethers) as Building Blocks for New Materials, Macromol. Symp. 1998, vol. 132, pp. 57-64.

* cited by examiner

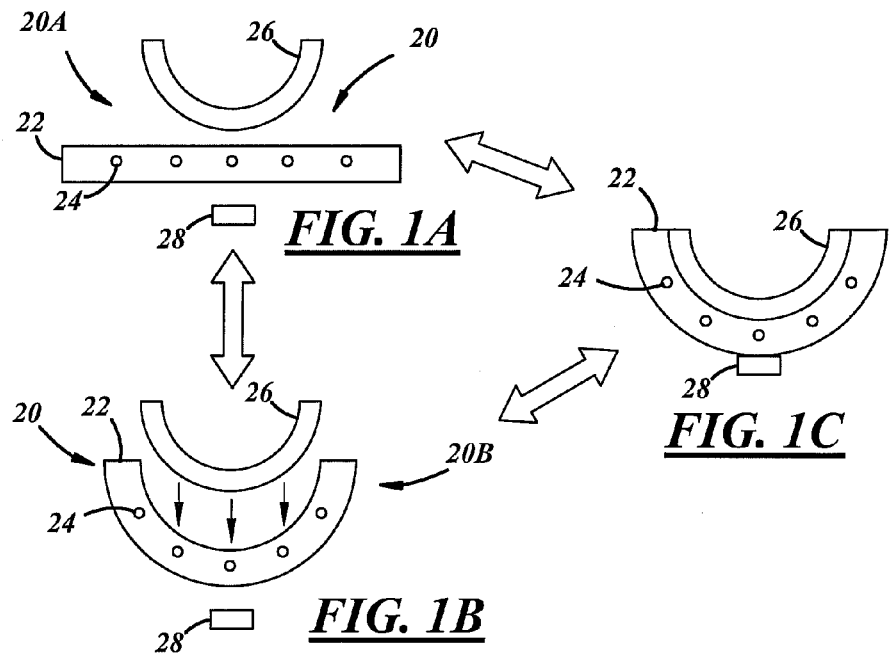
*FIG. 1A*
*FIG. 1B*
*FIG. 1C*
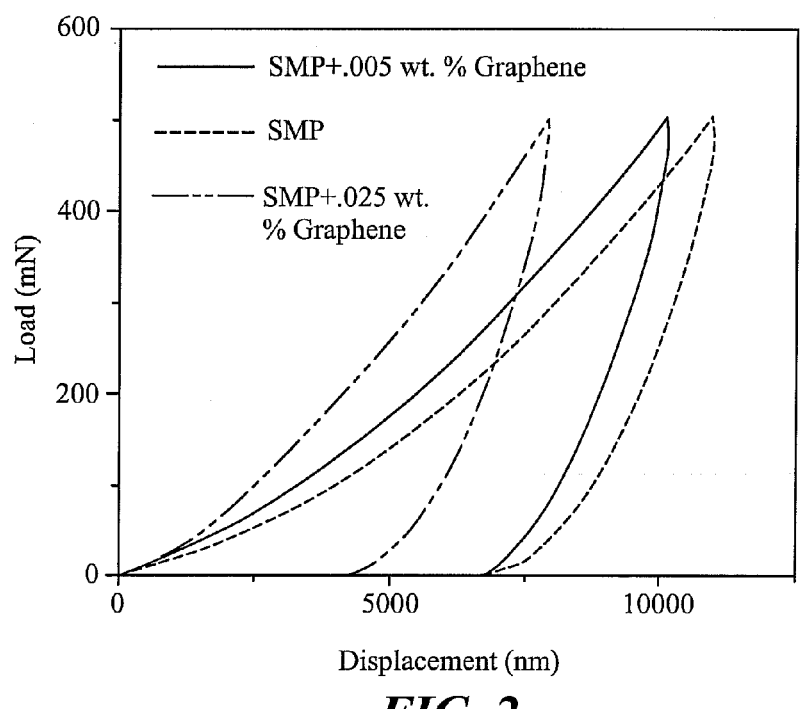
*FIG. 2*

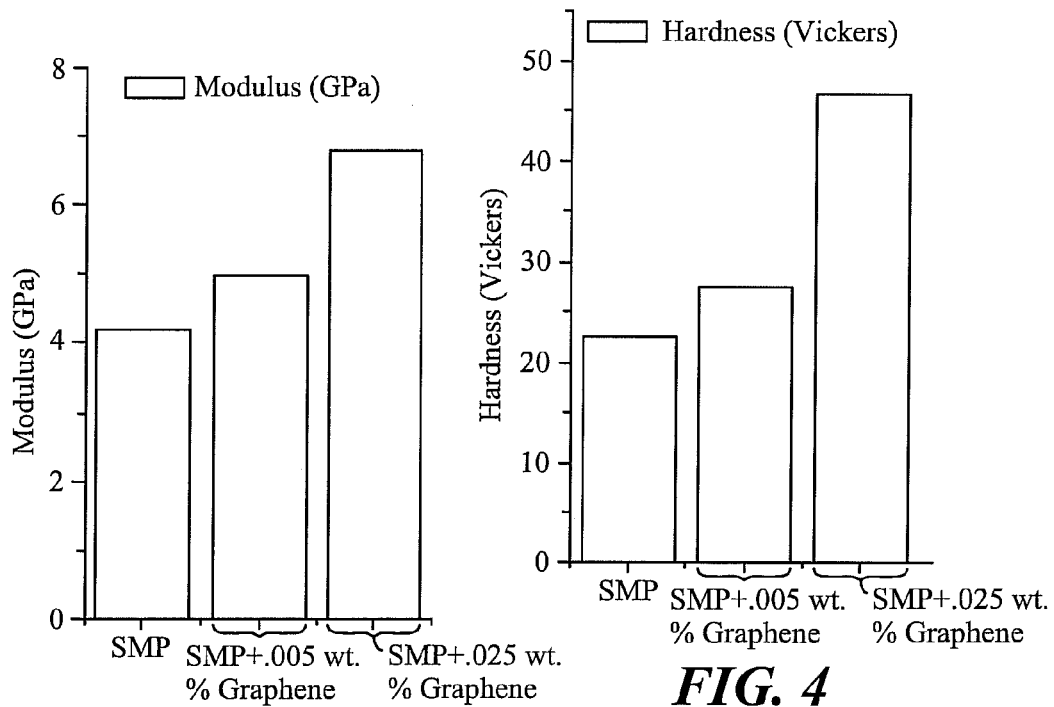
FIG. 3
FIG. 4
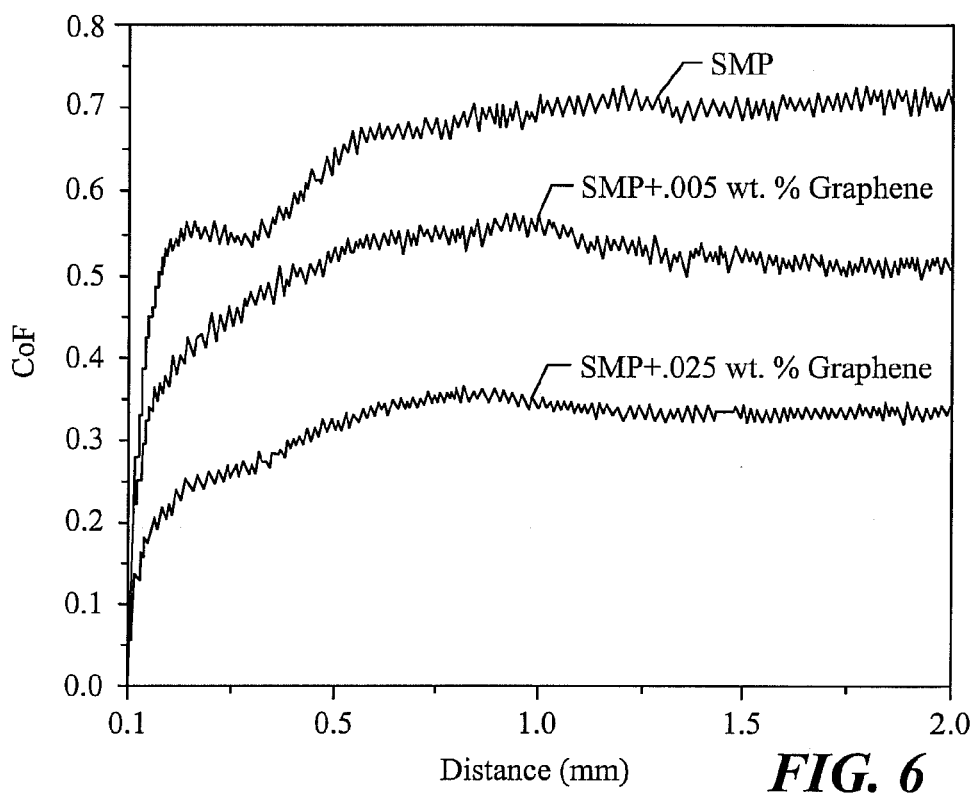
FIG. 6

SELF-HEALING AND SCRATCH RESISTANT SHAPE MEMORY POLYMER SYSTEM

TECHNICAL FIELD

The field to which the disclosure generally relates includes polymeric materials, and more specifically to a shape memory polymeric material systems that can fix to one or more deformed temporary shapes and recover to their original shape only upon external stimuli.

BACKGROUND

Shape memory polymers (SMPs) represent responsive polymers that can fix to deformed temporary shapes and recover to their permanent (original) shapes only upon external stimuli.

SUMMARY OF EXEMPLARY EMBODIMENTS OF THE INVENTION

One exemplary embodiment may include a polymer material system that includes a shape memory polymer and a graphene material.

An exemplary method for improving the scratch resistance and self healing capabilities of a polymeric system including a shape memory polymer material includes adding a graphene material to the shape memory polymer material.

An exemplary method may include forming a polymer system including a shape memory polymer material having a graphene material, transforming the polymer system from its permanent shape to a temporary shape, and coupling the polymer system in the temporary shape to at least one substrate material. The at least one substrate material may be subsequently uncoupled by transforming the polymer system back to its permanent shape.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1A is a perspective view of a polymeric material according to one exemplary embodiment having shape memory effect and in its original permanent shape;

FIG. 1B is a perspective view of the polymeric material of FIG. 1A transformed to a temporary shape;

FIG. 1C is a perspective view of the polymeric material of FIG. 1A transformed to a temporary shape and coupled between a pair of substrates;

FIG. 2 is a graphical illustration of a load versus displacement plot for shape memory polymer systems having increasing amounts of graphene;

FIG. 3 is a table comparing the elastic modulus of the shape memory polymer systems as determined from the graphical illustration of FIG. 2;

FIG. 4 is a table comparing the hardness of the shape memory polymer systems as determined from the graphical illustration of FIG. 2;

FIG. 6 is a graphical illustration of a coefficient of friction analysis at various points of a 2 millimeter scratch introduced to the of the shape memory polymer systems formed by a scratch test.

DETAILED DESCRIPTION OF EXEMPLARY EMBODIMENTS

Figure 5A:
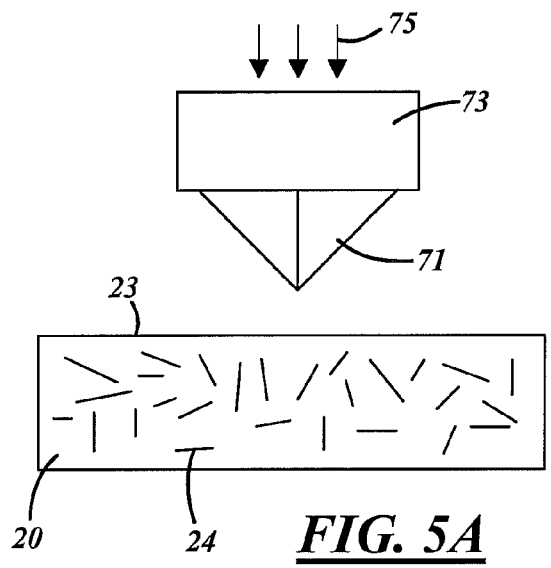
FIG. 5A illustrates a shape memory polymeric material according to one exemplary embodiment prior to indention.

The following description of the embodiment(s) is merely exemplary (illustrative) in nature and is in no way intended to limit the invention, its application, or uses.

Referring first to FIGS. 1A-1C, a polymeric material 20 having shape memory effect (SME) may be illustrated in its original permanent shape (shown as 20A in FIG. 1A) and in a first temporary shape (shown as 20B in FIGS. 1B and 1C).

The polymeric material 20 may formed from a shape memory polymer 22 and a graphene material 24, wherein the graphene material is in the range of about 0.005 to 2 weight percent of the polymeric material.

By definition, the permanent original shape 20A is the shape in which the polymeric material 20 will remain in the absence of deformation under load and elevated temperatures as will be described in further detail below.

To obtain the first temporary shape 20B from the original shape 20A, the permanent shape 20A may be heated to a first elevated temperature $T_{high}$ and then deformed under stress to yield the first temporary shape 20B, a shape which may be different in visual appearance from the permanent shape 20A. By definition, the first elevated temperature $T_{high}$ is a temperature sufficiently high to ensure a phase transition for the shape memory polymer material 22 (i.e. is a temperature above the glass transition temperature ($T_g$) of the shape memory polymer material 22). The polymeric material 20 may then be cooled under stress below $T_{high}$, wherein the stress may be relieved to fix the first temporary shape 20B. To recover the permanent shape 20A from the first temporary shape 20B, the polymeric material 20 may be reheated to the first elevated temperature $T_{high}$ in the absence of stress.

Graphene, as defined herein, is a one-atom-thick planar sheet of sp2-bonded carbon atoms that are densely packed in a honeycomb crystal lattice. A graphene material 24 may include one or more layers, but less than 10 layers, of graphene stacked onto each other.

Free standing graphene may be prepared in a microwave plasma enhanced chemical vapor deposition technique. Graphene may also be produced by other chemical vapor techniques such as thermal chemical vapor deposition (CVD), radio frequency plasma CVD, or direct current CVD. In these chemical vapor techniques, carbon containing precursors, such as acetylene or methane or ethylene, may be mixed with hydrogen at a deposition pressure of between about 40 and 100 torr and a growth temperature of between about 400 and 1000 degrees Celsius. The graphene particles may be collected by silicon and a graphite plate, or any other substrate that will not react with carbon in the growth temperature range.

The shape memory polymer material 22 may be formed, in one exemplary embodiment, from a rigid aromatic diepoxide (EPON 826), a flexible aliphatic diepoxide such as neopentyl glycol diglycidyl ether (NGDE), and an aliphatic diamine curing agent such as poly(propylene glycol)bis(2-aminopropyl)ether (Jeffamine D-230).

To form the polymeric material 20, in accordance with one exemplary embodiment, the graphene materials 24 are admixed with Jeffamine D-230 in an ultrasonic bath for about 30 minutes. EPON 826 was melted at about 75 degrees Celsius for 15 minutes. The melted EPON 826 was then mixed with the NGDE and Jeffamine D-230 (with the graphene material 24) at a mole ratio of about 1.6/0.4/1.0 to form a mixture. The mixture was then poured into a mold (not shown), cured at about 100 degrees Celsius for about 1 hour, and post-cured at about 130 degrees Celsius for about 1 hour to produce a shape molding polymer/graphene nanocomposite (i.e. the polymeric material 20). The cured polymeric material 20 was demolded and cut to a desired shape and size.

The introduction of a small amount of graphene material 24 to the shape memory polymer 22 provides several potential advantages to the shape memory polymer.

For example, the introduction of small amounts of graphene material 24 to the shape memory polymer 22 prepared as described may improve the toughness, and/or the hardness, of the polymeric material 20.

To test the toughness and hardness, samples of polymeric materials 20 having the same composition of shape memory polymeric material 22 and having varying levels of graphene material 24 were prepared and separately tested for toughness (elastic modulus) and hardness using a Vickers Indentor, available from CSM Instruments, Inc. of Needham, Mass., may be utilized.

Figure 5B:
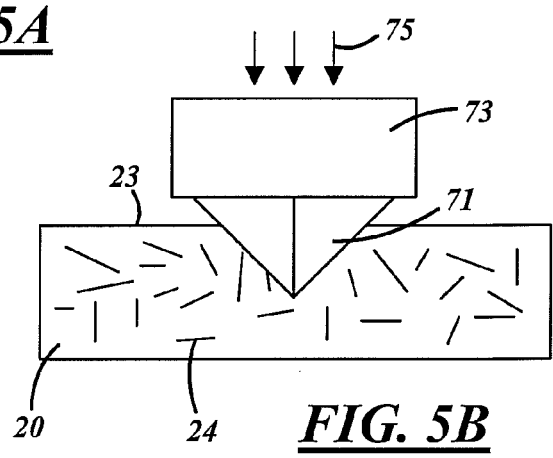
FIG. 5B illustrates the shape memory polymeric material being indented by a Vickers Indentor.
Figure 5C:
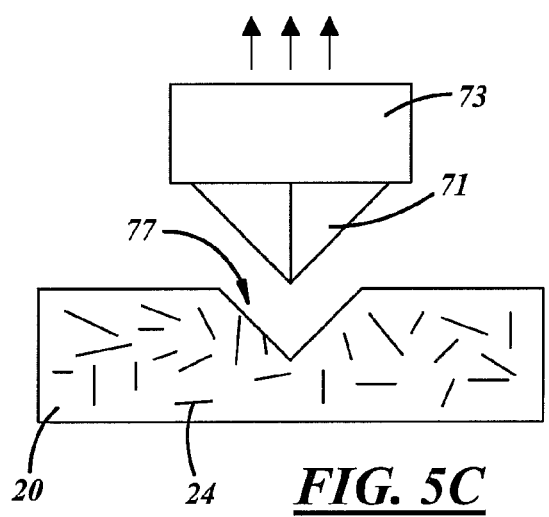
FIG. 5C illustrates the shape memory polymeric material of FIG. 5A after indention by the Vickers Indentor.

To test for toughness and for hardness, as shown in FIGS. 5A-5C, an indenter tip 71 of a Vickers Indentor 73 may be situated normal to the polymeric material sample surface 23, as shown in FIG. 5A. The indenter tip 71 may then be driven into the sample 20 by applying an increasing load up to a predefined value, as shown by arrows 75 in FIG. 5B. The load may then be decreased until the tip 73 is free of the material 20, therein forming the scratch 77 in the polymeric material 20 as shown in FIG. 5C.

The resultant load-depth curve created by the process shown in FIGS. 5A-5C, as shown in FIG. 2, may then be used to calculate mechanical properties such as elastic modulus, as shown in table form in FIG. 3, and hardness, as shown in table form in FIG. 4.

As shown in FIG. 3, the Modulus of the shape memory polymer material 22 (i.e. without graphene) measured at about 4.2 GPa, while the introduction of about 0.005 weight percent of graphene material 24 increased the Modulus to about 4.9 GPa. Moreover, the introduction of about 0.025 weight percent of graphene material 24 increased the Modulus to about 6.7 GPa.

As shown in FIG. 4, the hardness of the shape memory polymer material 22 (i.e. without graphene) measured at about 22 Vickers, while the introduction of about 0.005 weight percent of graphene material 24 increased the hardness to about 26 Vickers, which suggests about an 18.5% increase in hardness. Moreover, the introduction of about 0.025 weight percent of graphene material 24 increased the hardness to about 46 Vickers.

In addition, the introduction of small amounts of graphene material 24 to the shape memory polymer 22 prepared as described above may also decrease the coefficient of friction at a designated scratch length in the polymeric material 20, utilizing the Vickers Indentor. The tip material (commonly diamond or hard metal (WC)) of the Vickers Indentor may be drawn across the surface of the polymeric material 20 under a constant load to scratch the surface of the polymeric material 20 to a desired depth for a given distance. The coefficient of friction may then be measured at various points along the length of the scratch.

The coefficient of friction measures the force of friction between the tip material of the indentor and the polymeric material along the scratch length that is introduced to the polymeric material after it is formed to a desired size and shape. Polymeric materials having a higher coefficient of friction may have a greater tendency to crack as a result of the introduction of a scratch to its surface.

It is theorized that the lower surface friction may be the result of one of two distinct or related phenomenons. First, the multi-layer structure of the graphene material 24 may serve as a solid lubricant to reduce friction along the scratch 77. The resulting low friction force may reduce or avoid cracking generated along the scratch 77 as it is introduced to the surface 23 of the polymeric material 20.

Also, the graphene material 24 may increase fracture toughness due to the strong interface interaction between the graphene material 24 and the polymer matrix 22. This interface interaction may improve scratch resistance, which may result in no crack observed along the scratch.

In addition, the enhanced mechanical properties by adding the graphene material 24 may improve the capability for shape recovery of the polymeric material 20. Thus, if the indented polymeric material 20 of FIG. 5C is reheated to an elevated temperature, the scratch 77 may be lessened or eliminated, as shown transitioning from FIG. 5C back to FIG. 5A.

Alternatively, the reduced coefficient of friction may be the result of the ability of the polymeric material to resist as scratch as it is applied to the surface of the polymeric material. Such resistance may also include the ability of the polymeric material to resist cracking in areas near the applied scratch.

Further, a combination of both theories may be present, wherein a reduced coefficient of friction may be the result of the ability of the polymeric material to resist the scratch as it is applied to its surface followed by the ability of the polymeric material to "self-heal" as described above.

FIG. 6 graphically compares the coefficient of friction at given scratch lengths for polymeric materials 20 formed and described above with and without small amounts of graphene material 24. In FIG. 6, the tip material of the Vickers Indentor (similar to that shown in FIGS. 5A-5C) was drawn across the surface of the polymeric material 20 having varying levels of graphene material 24 (0, 0.005 weight percent, and 0.25 weight percent) under a constant load of 5N to scratch the surface of the polymeric material 20 to a desired depth in a distance of about 2 millimeters.

As FIG. 6 illustrates, the introduction of increasing levels (from 0.005 to 0.025) weight percent of graphene material 24 to the shape memory polymer 22 to form the polymeric material 20 resulted in lower coefficients of friction at virtually all scratch lengths between 0 and 2 millimeters, therein suggesting that the introduction of small amounts of graphene material 24 may provide improved scratch resistance, or self-healing, of polymeric materials 20 having shape memory characteristics.

In one exemplary use, the polymeric material 20 of the exemplary embodiments may be utilized to reversibly couple together one or more substrate materials. This may be accomplished by transforming the polymeric material 20 from its permanent shape 20A, as shown in FIG. 1A, to its temporary shape 20B, as shown in FIG. 1B, and coupling the polymeric material 20B to one or more substrate materials (shown as two substrate materials 26 and 28 in FIG. 1C). Subsequently, the one or more substrate materials may be uncoupled by transforming the polymeric material 20 from its temporary shape 20B back to its permanent shape 20A as described above (and illustrated transitioning from FIG. 1C to FIG. 1A). Thus, the polymeric material 20 of the exemplary embodiments may find an exemplary use in separating substrate materials 26 and 28 while they are being stored or transported. By increasing the toughness, or hardness, or scratch resistance of these polymeric materials 20 through the introduction of the graphene material 24, additional uses requiring these improved performance characteristics may be realized. For example, the improved toughness may allow the polymeric material 20 to be coupled to fragile substrate materials that may chip or break if contacted to other fragile substrate materials during shipping or storage.

The above description of embodiments of the invention is merely exemplary in nature and, thus, variations thereof are not to be regarded as a departure from the spirit and scope of the invention.

What is claimed is:

1. A method for improving the scratch resistance and self healing powers of a polymeric material including a shape memory polymer material, the method comprising:
    introducing a graphene material to the shape memory polymer material in an amount that improves the scratch resistance and self healing powers of the shape memory polymer material, wherein said graphene material comprises between about 0.005 and 0.025 weight percent of the shape memory polymer material.

2. The method of claim 1, wherein said graphene material comprises between about 0.005 and 2 weight percent of the shape memory polymer material.

3. The method of claim 1, wherein the shape memory polymer material comprises an epoxy thermosetting polymeric material.

4. The method of claim 1, wherein said graphene material comprises between 1 and 10 layers of graphene.

5. The method of claim 1, wherein said graphene material comprises more than one layer of graphene.

6. The method of claim 1 further comprising:
    forming the shape memory polymer material from an aromatic diepoxide, an aliphatic diepoxide, and an aliphatic diamine curing agent.

7. The method of claim 1 further comprising:
    preparing the graphene material using a microwave plasma enhanced chemical vapor deposition technique.

8. A method comprising:
    forming a shape memory polymer material;
    introducing an amount of a graphene material to said shape memory polymer to form a polymer system with improved scratch resistance and self healing powers, wherein said polymer system is capable of transforming between an original permanent shape and a temporary shape;
    providing at least one substrate material;
    providing said polymer system in said temporary shape;
    coupling said polymer system in said temporary shape to at least one of said at least one substrate materials, wherein said graphene material comprises between about 0.005 and 0.025 weight percent of the shape memory polymer material.

9. The method of claim 8, wherein said graphene material comprises between about 0.005 and 2 weight percent of the shape memory polymer material.

10. The method of claim 9, wherein said graphene material comprises between 1 and 10 layers of graphene.

11. The method of claim 8, wherein forming a shape memory polymer and introducing a graphene material to said shape memory polymer to form a polymer system comprises:
    providing an ultrasonic bath;
    mixing an aliphatic diamine curing agent and a small amount of a graphene material in said ultrasonic bath;
    introducing an aromatic diepoxide and an aliphatic diepoxide to said aliphatic diamine curing agent and said small amount of said graphene material to form a mixture;
    introducing said mixture to a mold;
    curing said mixture within said mold;
    optionally post-curing said cured mixture within said mold; and
    removing said cured mixture from said mold.

12. The method of claim 11, wherein the mole ratio of said aromatic diepoxide, said aliphatic diepoxide, and said aliphatic diamine curing agent within said mixture is about 1.6/0.4/1.0.

13. The method of claim 8 further comprising:
    transforming said polymer system from said temporary shape to said permanent shape; and
    uncoupling said polymer system in said permanent shape from said at least one of said at least one substrate materials.

14. The method of claim 8, wherein said at least one substrate material comprises at least two substrate materials, wherein each of said at two substrate materials is each individually coupled to said polymer system in said temporary shape.

* * * * *